US012540743B2

(12) United States Patent
Arumugam et al.

(10) Patent No.: US 12,540,743 B2
(45) Date of Patent: Feb. 3, 2026

(54) SYSTEM AND METHOD FOR RECYCLING EXHAUST AIR IN AN HVAC SYSTEM

(71) Applicant: Lennox Industries Inc., Richardson, TX (US)

(72) Inventors: Suyambu Lingam Arumugam, Tirunelveli (IN); Nishanth Verghese Devadas, Chennai (IN)

(73) Assignee: Lennox Industries Inc., Richardson, TX (US)

( * ) Notice: Subject to any disclaimer, the term of this patent is extended or adjusted under 35 U.S.C. 154(b) by 339 days.

(21) Appl. No.: 18/362,087

(22) Filed: Jul. 31, 2023

(65) Prior Publication Data

US 2025/0043976 A1 Feb. 6, 2025

(51) Int. Cl.

| | |
|---|---|
| ***F24F 7/08*** | (2006.01) |
| ***F24F 7/00*** | (2021.01) |
| ***F24F 11/00*** | (2018.01) |
| ***F24F 13/30*** | (2006.01) |

(52) U.S. Cl.

CPC ............ *F24F 7/08* (2013.01); *F24F 11/0001* (2013.01); *F24F 13/30* (2013.01); *F24F 2007/001* (2013.01)

(58) Field of Classification Search

CPC ..... F24F 7/08; F24F 2007/001; F24F 11/0001

See application file for complete search history.

(56) References Cited

U.S. PATENT DOCUMENTS 5,447,037 A * 9/1995 Bishop ..................... F24F 11/30 165/251
7,114,553 B2 * 10/2006 Edwards ............... F24F 12/006 165/59
7,891,573 B2 * 2/2011 Finkam .................... F24F 11/30 236/1 C
9,810,462 B2 * 11/2017 Douglas ................... F24F 11/63
9,874,362 B2 * 1/2018 Douglas ............... F24F 11/0001
11,268,722 B2 * 3/2022 Ferrere .................... F24F 11/46
2019/0226700 A1 * 7/2019 Tollar .................. F24F 13/0227
2019/0257538 A1 * 8/2019 Ferrere .................... F24F 11/46
2020/0088439 A1 * 3/2020 Bhosale ................ F24F 12/006
2021/0071891 A1 * 3/2021 Ferrere, Jr. .............. F24F 11/74
2021/0140663 A1 * 5/2021 Pourgol-Mohammad .................. F24F 11/64

* cited by examiner

*Primary Examiner* — Nelson J Nieves

(74) *Attorney, Agent, or Firm* — Baker Botts L.L.P.

(57) ABSTRACT

A method of operating a HVAC system is provided. The method includes receiving a first outdoor airflow and a return airflow in a first heat exchange space of a housing, where the housing comprises an interior wall that divides the housing into the first heat exchange space and a second heat exchange space. The method includes transferring the first outdoor airflow and a first portion of the return airflow across a first heat exchanger in the first heat exchange space to produce a first conditioned airflow that discharges to a target conditioned space. The method includes discharging a second portion of the return airflow from the first heat exchange space as exhaust airflow. The method includes transferring a second outdoor airflow and the portion of the exhaust air across a second heat exchanger in the second heat exchange space.

15 Claims, 3 Drawing Sheets

SYSTEM AND METHOD FOR RECYCLING EXHAUST AIR IN AN HVAC SYSTEM

TECHNICAL FIELD

This disclosure relates generally to heating, ventilation, and air conditioning (HVAC) systems. More particularly, this disclosure relates to a system and method for recycling exhaust air in an HVAC system.

BACKGROUND

Heating, ventilation, and air conditioning (HVAC) systems are used to regulate environmental conditions within an enclosed space. Air is cooled via heat transfer with refrigerant flowing through the HVAC system and returned to the enclosed space as conditioned air.

SUMMARY

The systems and methods described in the present application provide practical applications and technical advantages that overcome the current technical problems described herein. In some embodiments, the systems and methods described herein may generally relate to HVAC systems, and rooftop units (RTUs) in particular. In some instances, RTUs operate with a certain amount of fresh air that is mixed with return air from a target conditioned space. Mixing the fresh air with the return air can lead to a loss in performance due to a differential temperature with the return air. Embodiments of the present disclosure provide systems and methods that mitigate this loss, or otherwise reduce the loss, to improve a coefficient of performance (COP) of the HVAC system. The COP is a ratio of useful heating or cooling provided to work required.

In some embodiments, the provided systems and methods include a housing comprising an interior wall that divides the housing into a first heat exchange space having a first heat exchanger, and a second heat exchange space having a second heat exchanger. During a cooling mode of operation, the first heat exchanger may act as an evaporator and the second heat exchanger may act as a condenser. Exhaust airflow exiting the first heat exchange space during the cooling mode of operating contains a sizeable amount of cooling energy because it includes a portion of the cooled, return airflow from the target conditioned space. Embodiments of the present disclosure provide systems and methods that recycle a portion of the exhaust airflow from the first heat exchange space to the second heat exchanger in the second heat exchange space. During the cooling mode of operation, the recycled exhaust airflow mixes with outdoor air entering the second heat exchange space to reduce the temperature of the mixed airflow passing across the second heat exchanger (e.g., condenser), thereby improving the COP of the HVAC system by reducing the condensation temperature. During a heating mode of operation, the first heat exchanger may act as a condenser and the second heat exchanger may act as an evaporator. Exhaust airflow exiting the first heat exchange space during the heating mode of operating contains a sizeable amount of heating energy because it includes a portion of the heated, return airflow from the target conditioned space. Recycling a portion of the exhaust airflow to mix with outdoor air entering during the heating mode of operation increases the temperature of the mixed airflow passing across the second heat exchanger (e.g., evaporator), thereby improving COP of the HVAC system by increasing the evaporation temperature.

The disclosed systems and methods provide several practical applications and technical advantages. First, the disclosed systems and methods increase the COP in both heating and cooling modes of operation. Increasing the COP reduces the amount of energy utilized by the HVAC system to achieve the same amount of heating and cooling. Second, recycling the exhaust airflow from the first heat exchange space during the heating mode of operation slows down the ice formation leading to less defrost cycles during operation. Third, in some embodiments, controlling the amount of recycled exhaust airflow can defrost the second heat exchanger without having to reverse the cycle (e.g., by recycling from 70% to 100% of the exhaust airflow). Fourth, embodiments of the present disclosure provide a recycle conduit that is configured to communicate the exhaust airflow from the first heat exchange space to the second heat exchange space. The recycle conduit is low capital cost and adds minimal weight to the system, while substantially increasing the COP of the HVAC system.

In one embodiment, the present disclosure provides a heating, ventilation, and air conditioning (HVAC) system configured to regulate a temperature of a target conditioned space. The HVAC system includes a housing having an interior wall that divides the housing into a first heat exchange space and a second heat exchange space. In some embodiments, the first heat exchange space includes a first outdoor air inlet configured to allow a first outdoor airflow to communicate with the first heat exchange space and a first return air inlet configured to allow a return airflow from the target conditioned space to communication with the first heat exchange space. The first heat exchange space further includes a supply air outlet configured to allow a first conditioned airflow to discharge from the first heat exchange space and a first exhaust air outlet configured to allow a portion of the return airflow to discharge from the first heat exchange space as an exhaust airflow. The first heat exchange space further comprising a first heat exchanger having a hollow interior space that comprises a working fluid and an outer surface configured to contact the first outdoor airflow and the return airflow. The first heat exchanger configured to transfer heat between the working fluid, the first outdoor airflow, and the return airflow to produce the first conditioned airflow. The second heat exchange space comprises a second outdoor air inlet configured to allow a second outdoor airflow to communicate with the second heat exchange space. The second heat exchange space includes a second heat exchanger having a hollow interior space that comprises the working fluid and an outer surface configured to contact the second outdoor airflow. The second heat exchanger is configured to transfer heat between the working fluid and the second outdoor airflow to product a second conditioned airflow. The second heat exchange space includes a second exhaust outlet configured to allow the second conditioned airflow to discharge from the second heat exchange space. The HVAC system includes a recycle conduit having a recycle inlet configured to receive a portion of the exhaust airflow from the first exhaust air outlet, where the recycle conduit is configured to communication the portion of the exhaust airflow from the recycle inlet to the second heat exchanger through at least one recycle outlet.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Embodiments of the present disclosure and its advantages are best understood by referring to FIGS. 1 through 4 of the drawings, like numerals being used for like and corresponding parts of the various drawings.

As described above, some HVAC systems, such as RTUs, operate with a certain amount of fresh air that is mixed with return air from a target conditioned space. Mixing the fresh air with the return air can lead to a loss in performance due to a differential temperature with the return air. Embodiments of the present disclosure provide systems and methods that mitigate this loss, or otherwise reduce the loss, to improve the COP of the HVAC system. During a cooling mode of operation, embodiments of the present disclosure provide systems and methods for recycling a portion of exhaust airflow from a first heat exchange space comprising a first heat exchanger acting as an evaporator to a second heat exchange space comprising a second heat exchange coil acting as a condenser. The portion of the exhaust airflow mixes with outdoor air entering the second heat exchange space to reduce the mixed airflows temperature passing across the second heat exchanger, thereby improving the COP of the HVAC system by reducing the condensation temperature. During a heating mode of operation, embodiments of the present disclosure provide systems and methods for recycling a portion of exhaust airflow from the first heat exchange space comprising a first heat exchanger acting as a condenser to a second heat exchange space comprising the second heat exchanger acting as an evaporator. The portion of the exhaust airflow mixes with the outdoor air entering the second heat exchange space to increase the mixed airflows temperature passing across the second heat exchanger, thereby improving the COP of the HVAC system by increasing the evaporation temperature.

HVAC System

Figure 1:
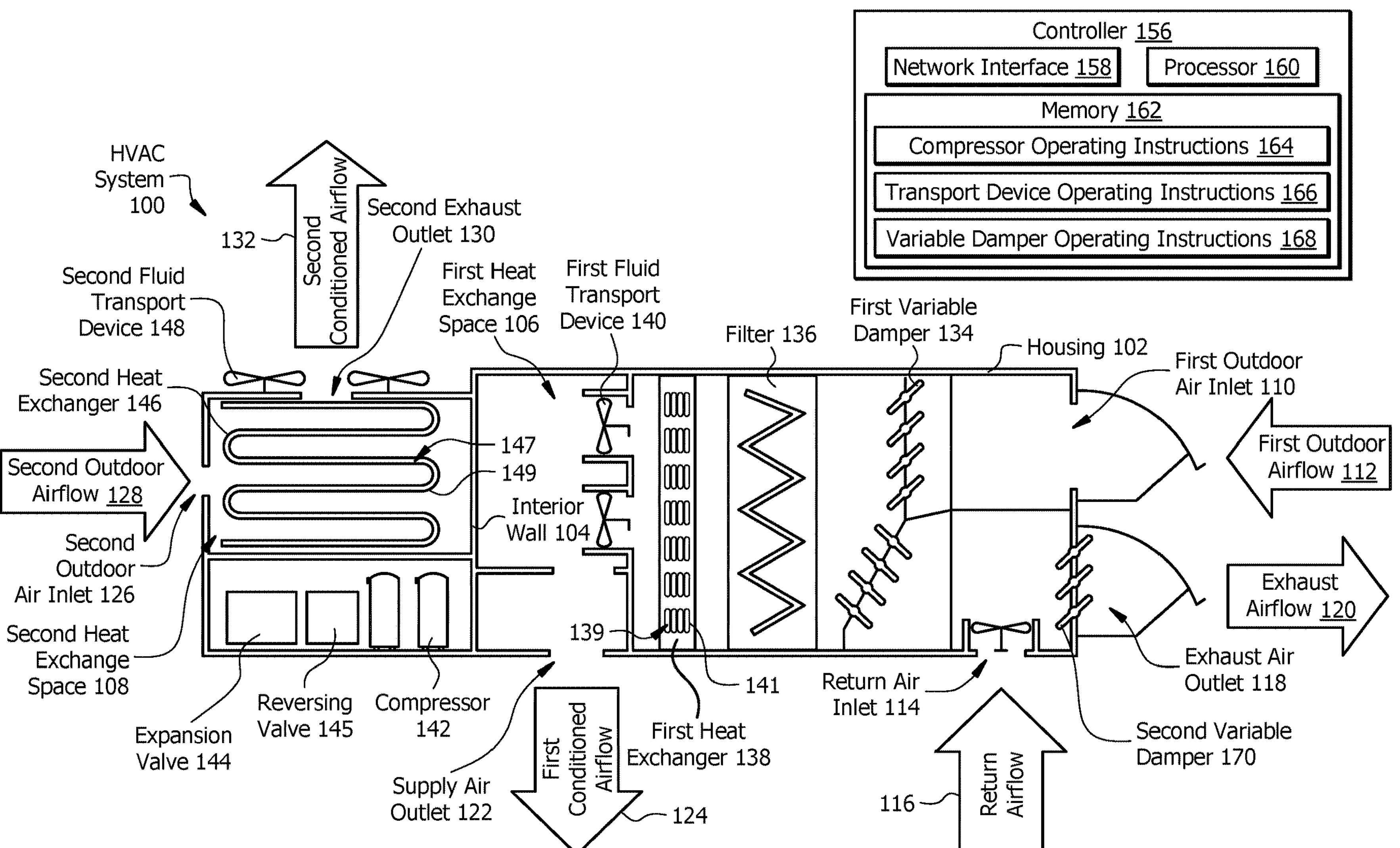
FIG. 1 illustrates a side view of an HVAC system according to an embodiment of the present disclosure.
Figure 2:
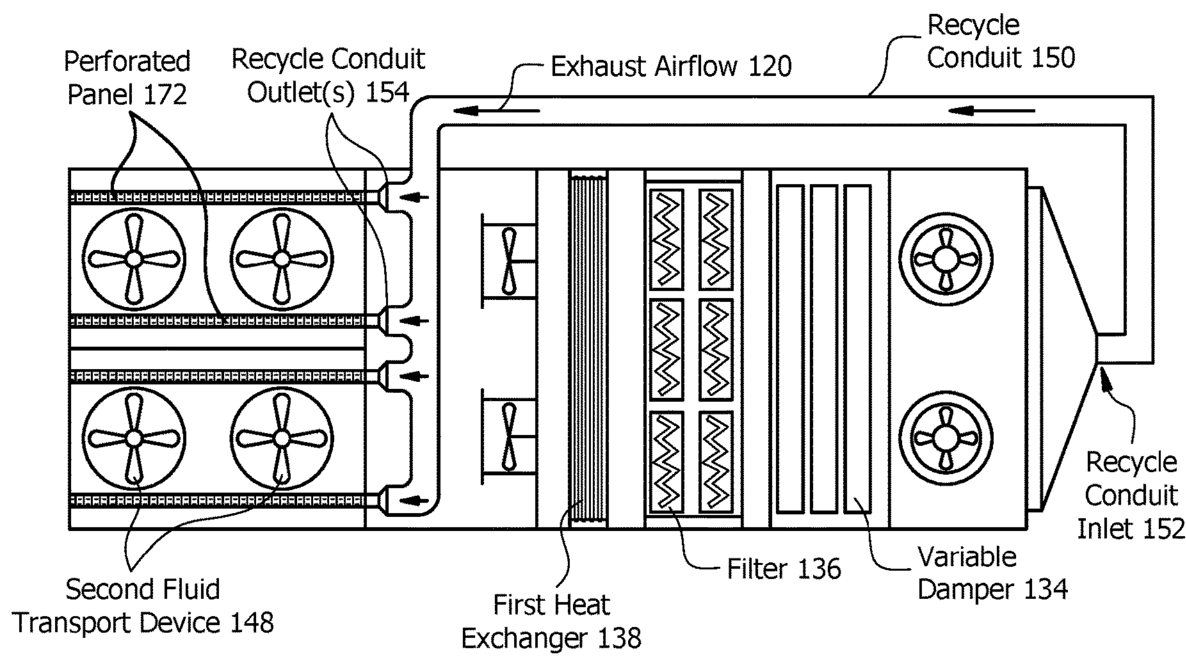
FIG. 2 illustrates a top view of the HVAC system illustrated in FIG. 1.
Figure 3:
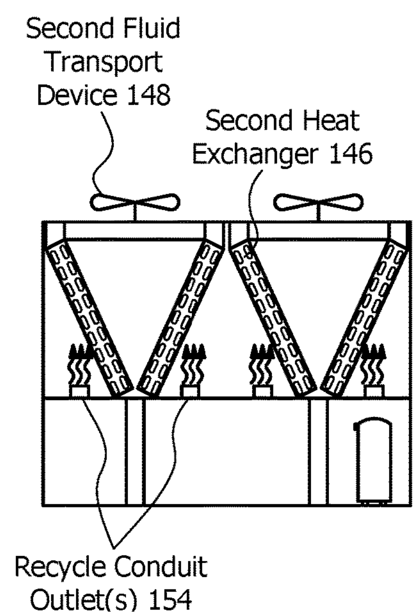
FIG. 3 illustrates a side view of the second heat exchange space of the HVAC system illustrated in FIG. 1.

FIGS. 1-3 show an example HVAC system 100 according to an embodiment of the present disclosure. The HVAC system 100 conditions air for delivery to a target conditioned space 101 (e.g., all or a portion of a room, a house, an office building, a warehouse, or the like). In some embodiments, the HVAC system 100 is a rooftop unit (RTU) that is positioned on the roof of a building, and the conditioned air is delivered into the interior of the building. The HVAC system 100 may include one or more heating elements, not shown for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a housing 102 comprising an interior wall 104 that divides the housing 102 into a first heat exchange space 106 and a second heat exchange space 108. The interior wall 104 is configured to prevent airflow from being exchanged between the first heat exchange space 106 and the second heat exchange space 108. The first heat exchange space 106 of the housing 102 includes a first outdoor air inlet 110 configured to allow a first outdoor airflow 112 to communicate with the first heat exchange space 106 and a return air inlet 114 configured to allow a return airflow 116 from the target conditioned space 101 to communicate with the first heat exchange space 106. The first heat exchange space 106 of the housing 102 further comprises an exhaust outlet 118 configured to allow a portion of the return airflow 116 to discharge from the first heat exchange space 106 as an exhaust airflow 120 and a supply air outlet 122 configured to allow a first conditioned airflow 124 to discharge from the first heat exchange space to the target conditioned space 101. The second heat exchange space 108 of the housing 102 comprises a second outdoor air inlet 126 configured to allow a second outdoor airflow 128 to communicate with the second heat exchange space 108 and a second exhaust outlet 130 configured to allow a second conditioned airflow 132 to discharge from the second heat exchange space 108.

The first heat exchange space 106 of the housing 102 further comprises a first variable damper 134, at least one filter 136, a first heat exchanger 138, and a first fluid transport device 140. The second heat exchange space 108 of the housing 102 further comprises a compressor 142, an expansion valve 144, a reversing valve 145, a second heat exchanger 146, and a second fluid transport device 148. Referring momentarily to FIGS. 2-3, the HVAC system 100 includes a recycle conduit 150 having a recycle conduit inlet 152 configured to receive a portion of the exhaust airflow 120 from the first exhaust air outlet 118. The recycle conduit is configured to communicate the portion of the exhaust airflow 120 from the recycle inlet 152 to the second heat exchange space 108, and particularly at least a portion of the second heat exchanger 146, through at least one recycle conduit outlet 154. The HVAC system 100 further comprises a controller 156 that is generally configured to regulate the flow rate of working fluid in the HVAC system 100 using the compressor 142 and the flow rate of various airflows using the first fluid transport device 140 and the second fluid transport device 148.

The compressor 142 is coupled to a working fluid conduit (not shown) and compresses (e.g., increases the pressure) of a working fluid within the working fluid conduit. The working fluid conduit facilitates the movement of working fluid (e.g., one or more refrigerants) through the first heat exchanger 138, the compressor 142, the expansion valve 144, the reversing valve 145, and the second heat exchanger 146. The flow path of the working fluid through the HVAC system 100 depends on the operating mode of the system. Both a cooling mode of operation and a heating mode of operation are detailed below, along with the various HVAC system 100 components.

HVAC System in Cooling Mode

During a cooling mode of operation for the HVAC system 100, the compressor 142 compresses the working fluid in the working fluid conduit and transports the working fluid to the reversing valve 145. The reversing valve 145 is coupled to the working fluid conduit and diverts the working fluid to the second heat exchanger 146 in the cooling mode. The compressor 142 is in signal communication with the controller 156 using wired and/or wireless connection. The controller 156 includes compressor operating instructions 164 that have commands and/or signals to control operation of the compressor 142. The controller 156 may also receive signals from the compressor 142 corresponding to a status of the compressor 142. The compressor 142 may be a single-speed, variable-speed, or multiple stage compressor. A variable-speed compressor is generally configured to operate at different speeds to increase the pressure of the working fluid to keep the working fluid moving along the working-fluid conduit. In the variable-speed compressor configuration, the speed of compressor 142 can be modified to adjust the cooling (and heating) capacity of the HVAC system 100. Meanwhile, in the multi-stage compressor configuration, one or more compressors can be turned on or off to adjust the cooling (and heating) capacity of the HVAC system 100.

The second heat exchanger 146 is generally any heat exchanger configured to provide heat transfer between the working fluid and the second outdoor airflow 128. For example, the second heat exchanger 146 may have a hollow interior space 147 configured to receive the working fluid from the working fluid conduit and an outer surface 149 configured to contact the second outdoor airflow 128. In some embodiments, the second heat exchanger 146 comprises a heat exchange coil. During the cooling mode of operation, the second heat exchanger 146 is generally located downstream of the reversing valve 145 and the compressor 142, and the second heat exchanger 146 is configured to act as a condenser to remove heat from the working fluid. For example, during the cooling mode of operation, the second outdoor airflow 128 has a cooler temperature than the working fluid passing through the second heat exchanger 146, and heat is transferred from the working fluid in the second heat exchanger 146 to the second outdoor airflow 128 to produce a second conditioned airflow 132. The second conditioned airflow 132 discharges from the second heat exchange space 108 through the second exhaust outlet 130. A second fluid transport device 148 is configured to move the second outdoor airflow 128 across the outer surface 149 of the second heat exchanger 146. For example, the second fluid transport device 148 may be a fan configured to blow the second outdoor airflow 128 across the second heat exchanger 146 to help cool the working fluid flowing therethrough. The second fluid transport device 148 may be in communication with the controller 156 (e.g., via wired and/or wireless communication) to receive transport device operating instructions 166. The transport device operating instructions 166 may include control signals for turning the second fluid transport device 148 on and off and/or adjusting a speed of the second fluid transport device 148. The compressed, cooled working fluid flows from the second heat exchanger 146 during the cooling mode operation toward the expansion valve 144 via the working fluid conduit.

During the cooling mode of operation, the expansion valve 144 is coupled to the working fluid conduit downstream of the second heat exchanger 146 and is configured to reduce pressure from the working fluid. In general, the expansion valve 144 may be a valve such as an expansion valve or a flow control valve (e.g., a thermostatic expansion valve (TXV)) or any other suitable valve for reducing pressure from the working fluid while, optionally, providing control of the rate of flow of the working fluid.

During the cooling mode of operation, the first heat exchange 138 is configured to receive the working fluid from the expansion valve 144. The first heat exchanger 138 is generally any heat exchanger configured to provide heat transfer between the working fluid, the first outdoor airflow 112 and a portion of the return airflow 116. For example, the first heat exchanger 138 may have a hollow interior space 139 configured to receive the working fluid from the working fluid conduit and an outer surface 141 configured to contact the first outdoor airflow 112 and a portion of the return airflow 116 as each respective airflow passes across the first heat exchanger 138. In some embodiments, the first heat exchanger 138 comprises a heat exchange coil. During the cooling mode of operation, the first heat exchanger 138 is fluidly connected to the compressor 142 such that working fluid generally flows from the first heat exchanger 138 to the compressor 142. The first heat exchanger 138 in the cooling mode operates as an evaporator to cool the first outdoor airflow 112 and the portion of the return airflow 116 passing across the outer surface 141 of the first heat exchanger 138.

A first fluid transport device 140 is positioned in the first heat exchange space 106 and configured to move the first outdoor airflow 112 and a portion of the return airflow 116 across the outer surface 141 of the first heat exchanger 138 to produce the first conditioned airflow 124. The first conditioned airflow exits the first heat exchange space 106 through the supply air outlet 122 to the target conditioned space 101 (e.g., room, house, office building, etc.). The first fluid transport device 140 may be any suitable device for transporting airflow including, but not limited to, a fan, a blower or the like. The first fluid transport device 140 may be in communication with the controller 156 (e.g., via wired and/or wireless communication) to receive transport device operating instructions 166. The transport device operating instructions 166 may include control signals for turning the first fluid transport device 140 on and off and/or adjusting a speed of the first fluid transport device 140.

A filter 136 is positioned in the first heat exchange space 106 and is configured to filter pollutants or contaminants out of the first outdoor airflow 112 and the portion of the return airflow 116 before the respective airflow is passed across the outer surface 141 of the first heat exchanger 138. Any suitable filter 136 may be used that removes pollutants or contaminants from a respective airflow including, but not limited to, high-efficiency particulate air (HEPA) filters, electrostatic filters, pleated filters, fiberglass or spun glass filters, or combinations thereof.

A first variable damper 134 is positioned in the first heat exchange space 106 and is configured to regulate an amount of airflow that passes therethrough. The first variable damper 134 may include damper plates that are movable between an open position that allows airflow to pass through the damper plates and a closed position that blocks the passage of airflow through the damper plates. The damper plates may be moved manually by turning a handle outside of the HVAC system 100 or may be controlled by electric or pneumatic motors. In some embodiments, the first variable damper 134 regulates an amount of the return airflow 116 that mixes with the first outdoor airflow 112 by adjusting the position of the damper plates. The first variable damper 134 may also be configured to regulate an amount of return airflow 116 that is discharged from the first heat exchange space 106 as exhaust airflow 120 by adjusting the position of the damper plates. In some embodiments, a second variable damper 170 is positioned in the exhaust air outlet 118 to regulate an amount of return airflow 116 that is discharged from the first heat exchange space 106 as exhaust airflow 120, and/or the second variable damper 170 may be positioned in the recycle conduit 150 to regulate an amount of return airflow 116 that is recycled through the recycle conduit 150 as exhaust airflow 120. The second variable damper 170 may include damper plates that are movable between an open position that allows airflow to pass through the damper plates and a closed position that blocks the passage of airflow through the damper plates. The first variable damper 134 and the second variable damper 170 may be in communication with the controller 156 (e.g., via wired and/or wireless communication) to receive variable damper operating instructions 168. The variable damper operating instructions 168 may include control signals for the electric or pneumatic motors for adjusting the position of the damper plates to control the amount of airflow that passes through the respective variable damper 134, 170.

Referring to FIGS. 2-3, the recycle conduit 150 includes a recycle conduit inlet 152 that is configured to receive a portion of the exhaust airflow 120 from the first exhaust air outlet 118. The recycle conduit 150 is configured to communicate a portion of the exhaust airflow 120 to the second heat exchanger 148 in the second heat exchange space 108 via at least one recycle conduit outlet 154. During the cooling mode of operation, the exhaust airflow 120 mixes with the second outdoor airflow 128 entering the second heat exchange space 108 to reduce the temperature of the mixed airflow passing across the second heat exchanger 146. Since the second heat exchanger 146 acts as a condenser configured to remove heat from the working fluid during the cooling mode, lowering the temperature of the mixed airflow using the previously cooled, recycled exhaust airflow 120 improves the COP of the HVAC system 100 by reducing the condensation temperature. The second variable damper 170 may regulate an amount of exhaust airflow 120 that is recycled through the recycle conduit 150. The portion of exhaust airflow 120 that is not recycle is configured to discharge from the first heat exchange space 106 through the exhaust air outlet 118.

In some embodiments, the second variable damper 170 may be configured by controlling the position of the damper plates to recycle at least 10% of the exhaust airflow 120 to the second heat exchange space 108 via the recycle conduit 150, or at least 20%, at least 30%, at least 40%, at least 50%, to less than 60%, less than 70%, less than 80%, less than 90%, or less than 100%.

In some embodiments, the recycle conduit 150 includes a plurality of recycle conduit outlets 154 configured to discharge the portion of exhaust airflow 120 to the second heat exchange space 108, and in some embodiments is configured to discharge to contact the outer surface 149 of the second heat exchanger 146. In some embodiments, a portion or of all the recycle outlets 154 comprise a perforated panel 172 that discharges the exhaust airflow 120 to contact the outer surface 149 of the second heat exchanger 146. In some embodiments, the perforated panel 172 helps to distribute the exhaust airflow 120 throughout the second heat exchange space 108 to improve mixing with the second outdoor airflow 128. The perforated panel 172 may extend the width of the second heat exchange space 108. As shown in FIG. 3, in some embodiments, the recycle conduit outlets 154 may be positioned below a portion of the second heat exchanger 146 and the second fluid transport device 148 may be positioned above the second heat exchanger 146. In this way, the second fluid transport device 148 may be configured to pull the portion of the exhaust airflow 120 across the outer surface 149 of the second heat exchanger 146.

The controller 156 is communicatively coupled (e.g., via wired and/or wireless connection) to components in the HVAC system 100 and configured to control their operation. In some embodiments, controller 156 can be one or more controllers associated with one or more components of the HVAC system 100. The controller 156 includes a network interface 158, a processor 160, and a memory 162. The processor 160 comprises one or more processors operably coupled to the memory 162. The processor 160 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs) that communicatively couples to memory 162 and controls the operation of HVAC system 100. The processor 160 may be a programmable logic device, a microcontroller, a microprocessor, or any suitable combination of the preceding. The processor 160 is communicatively coupled to and in signal communication with the memory 162. The one or more processors are configured to process data and may be implemented in hardware or software. For example, the processor 160 may be 8-bit, 16-bit, 32-bit, 64-bit or of any other suitable architecture. The processor 160 may include an arithmetic logic unit (ALU) for performing arithmetic and logic operations, processor registers that supply operands to the ALU and store the results of ALU operations, and a control unit that fetches instructions from memory 162 and executes them by directing the coordinated operations of the ALU, registers, and other components. The processor 160 may include other hardware and software that operates to process information, control the HVAC system 100, and perform any of the functions described herein. The processor 160 is not limited to a single processing device and may encompass multiple processing devices.

The memory 162 includes one or more disks, tape drives, or solid-state drives, and may be used as an over-flow data storage device, to store programs when such programs are selected for execution, and to store instructions and data that are read during program execution. The memory 162 may be volatile or non-volatile and may comprise ROM, RAM, ternary content-addressable memory (TCAM), dynamic random-access memory (DRAM), and static random-access memory (SRAM). The memory 162 is operable to store any suitable set of instructions, logic, rules, and/or code for executing the functions described in this disclosure. For example, the memory 162 may store compressor operating instructions 164, transport device operating instructions 166, variable damper operating instructions 168, and/or operating parameters for components in the system 100.

The network interface 158 is configured to communicate data and signals with other devices. For example, the network interface 158 may be configured to communicate electrical signals with the other components of the HVAC systems 100. The network interface 158 may comprise ports and/or terminals for establishing signal communications between the controller 156 and other devices. The network interface 158 may be configured to enable wired and/or wireless communications. Connections between various components of the HVAC system 100 may be wired or wireless. For example, conventional cable and contacts may be used. In some embodiments, a wireless connection is employed to provide at least some of the connections between components of the HVAC system 100. In some embodiments, a data bus couples various components of the HVAC system 100 together such that data is communicated there between. In a typical embodiment, the data bus may include, for example, any combination of hardware, software embedded in a computer readable medium, or encoded logic incorporated in hardware or otherwise stored (e.g., firmware) to couple components of HVAC system 100 to each other.

As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 156 to other components of the HVAC system 100.

HVAC System in Heating Mode

During a heating mode of operating for the HVAC system 100, the compressor 142 compresses the working fluid in the working fluid conduit and transports the working fluid to the reversing valve 145. The reversing valve 145 is coupled to the working fluid conduit and diverts the working fluid to the first heat exchanger 138. The first fluid transport device 140 is configured to transport the first outdoor airflow 112 and a portion of the return airflow 116 across and outer surface 141 of the first heat exchanger 138. During the heating mode, the first heat exchanger acts as a condenser to transfer heat from the working fluid to the first outdoor airflow 112 and the portion of return airflow 116 passing across the outer surface 141 of the first heat exchanger 138. For example, during the heating mode of operation, the mixture of the first outdoor airflow 112 and the return airflow 116 has a cooler temperature than the working fluid passing through the first heat exchanger 138 and heat is transferred from the working fluid to the mixture to produce the first conditioned airflow 124 that provides heating to the target conditioned space 101. Although not shown in FIG. 1, the HVAC system 100 may include an additional heating element to assist in heating the first outdoor airflow 112 and the return airflow. The heating element may be any device for heating the airflow including, but not limited to, a gas furnace or electrical heater.

During the heating mode of operation, the expansion valve 144 is coupled to the working fluid conduit downstream of the first heat exchanger 138 and is configured to reduce pressure from the working fluid. The second heat exchanger 146 is configured to receive the working fluid from the expansion valve 144. The second heat exchanger in the heating mode acts as an evaporator to remove heat from the second outdoor airflow 128 to the working fluid in the second heat exchanger 146. During the heating mode of operation, the second heat exchanger 146 is fluidly connected to the compressor 142 such that working fluid flows from the second heat exchanger 146 to the compressor 142, and the flow cycle can be repeated.

During the heating mode, the first and second variable dampers 134, 170 are configured to divert a portion of the return airflow 116 to the recycle conduit 150 in the form of exhaust airflow 120. The recycle conduit 150 communicates a portion of the exhaust airflow 120 to the second heat exchanger 146 in the second heat exchange space 108 via the at least one recycle conduit outlet 154. During the heating mode of operation, the exhaust airflow 120 mixes with the second outdoor airflow 128 entering the heat exchange space 108 to increase the evaporating temperature of the second heat exchanger 146 by increasing the temperature of the mixed airflow passing across the second heat exchanger 146. Since the second heat exchanger 146 acts as an evaporator to add heat to the working fluid during the heating mode, increasing the temperature of the mixed airflow using the previously heated, recycled exhaust airflow 120 improves the COP of the HVAC system 100 by increasing the evaporation temperature.

System Operation

Figure 4:
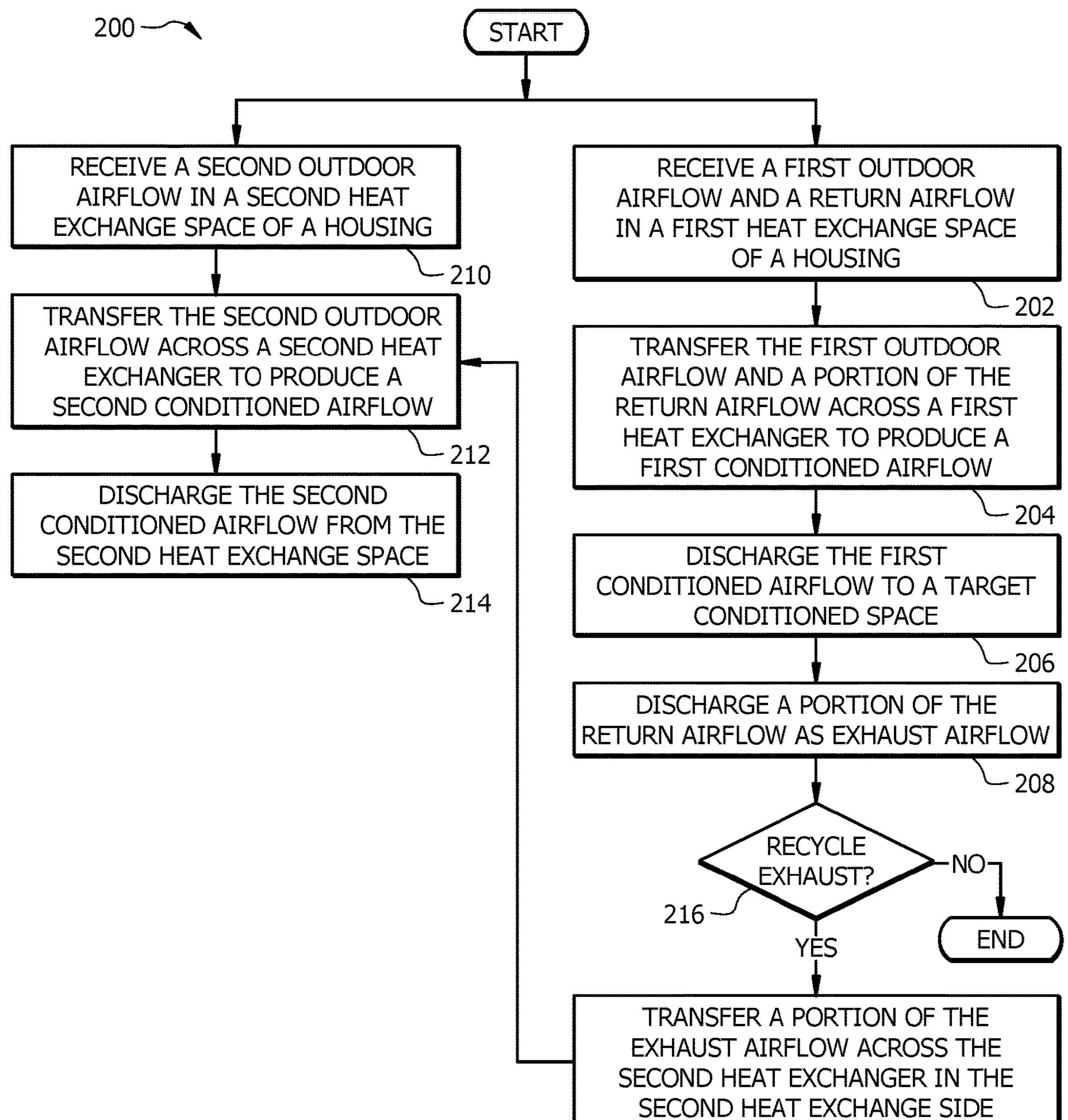
FIG. 4 illustrates a flowchart of a method for operating the HVAC system of FIG. 1.

FIG. 4 illustrates an operational flow 200 of the system of FIGS. 1-3. The operational flow 200 can be logically described in two parts. The first part includes operations 202-208, which generally includes receiving a first outdoor airflow 112 and a return airflow 116 in a first heat exchange space 106 of a housing 102, transferring the first outdoor airflow 112 and a portion of the return airflow 116 across the first heat exchanger 138 to produce a first conditioned airflow 124, discharging the first conditioned airflow 124 to a target conditioned space, and discharging a portion of the return airflow 116 as exhaust airflow 120 from the first heat exchange space 106. The second part includes operations 210-218, which generally includes receiving a second outdoor airflow 128 in a second heat exchange space 108 of the housing, transferring the second outdoor airflow 128 across the second heat exchanger 146 to produce a second conditioned airflow 132, and discharging the second conditioned airflow 132 from the second heat exchange space 108. The second part further includes transferring a portion of the exhaust airflow 120 from the first heat exchange space 108 to the second heat exchange space 106 such that the portion of the exhaust airflow 120 passes across the second heat exchanger 146.

In operation, the operational flow 200 may begin at operation 202 where the first heat exchange space 106 receives a first outdoor airflow 112 and a return airflow 116 from a conditioned space. At operation 204, the first outdoor airflow 112 and a portion of the return airflow 116 are transferred across the first heat exchanger 138 to produce the first conditioned airflow 124 that is transferred to the target conditioned space. In some embodiments, operation 204 further includes transferring the first outdoor airflow 112 and the portion of the return airflow 116 through a filter 136 to remove contaminants and/or pollutants prior to transferring across the first heat exchanger 138. One or more fluid transport device 140 may be positioned in the first heat exchange space 106 to pull the outdoor airflow 112 and the return airflow 116 into the first heat exchange space 106 during operation 202, and the one or more fluid transport device 140 may transfer each respective airflow 112, 116 across the first heat exchanger 138 during operation 204. In some embodiments, operation 204 further includes using the first variable damper 134 to regulate an amount of the return air 116 that is transferred to the first heat exchanger 138.

At operation 206, the operational flow 200 includes discharging the first conditioned airflow 124 to the target conditioned space. During a cooling mode of operation, the first heat exchanger 138 acts as an evaporator to cool the first outdoor airflow 112 and the portion of the return airflow 116 to produce a first conditioned airflow 124 that cools the target conditioned space 101. During a heating mode of operation, the first heat exchanger 138 acts as a condenser to transfer heat from the working fluid in the first heat exchanger 138 to the first outdoor airflow 112 and the portion of the return airflow 116 to produce the first conditioned airflow 124 that heats the target conditioned space 101. At operation 208, the operational flow includes discharging a portion of the return airflow 116 from the first heat exchange space 106 as exhaust airflow 120. In some embodiments, operation 208 includes regulating the portion of return airflow 116 that discharges from the first heat exchange space 106 by adjusting the first and second variable dampers 134, 170.

At operation 210, the operational flow 200 includes receiving a second outdoor airflow 128 in a second heat exchange space 108 of the housing 102. In some embodiments, operation 202 and 210 occur simultaneously. At operation 212, the second outdoor airflow 128 is transferred across an outer surface 149 of the second heat exchanger 146 to produce a second conditioned airflow 132 that is discharged from the second heat exchange space 108. One or more second fluid transport device 148 may be positioned in or proximate to the second heat exchange space 108 to transfer the second outdoor airflow 128 across the second heat exchanger 146. At operation 214, the second conditioned airflow 132 may be discharged from the second heat exchange space 108. The second conditioned airflow 132 may be discharged using the one or more second fluid transport device 148. During a cooling mode of operation, the second heat exchanger 146 acts as a condenser to remove heat from the working fluid to the second outside airflow 128 during the cooling mode. During a heating mode of operation, the second heat exchanger 146 acts as an evaporator to remove heat from the second outdoor airflow 128 and transfer the heat to the working fluid in the second heat exchanger 146.

At decision block 216, the operational flow 200 includes determining whether a portion of the exhaust airflow 120 should be recycled to the second heat exchange space 108. If it is determined that the exhaust airflow 120 should not be recycled, the operational flow 200 may end. Alternatively, the operational flow 200 proceeds to operation 218 where a portion of the exhaust airflow is transferred from the first heat exchange space 106 to the second heat exchange space 108 to mix with the second outdoor airflow in operation 212, where the operation flow may proceed to operation 214. In some embodiments, the portion of the exhaust airflow 120 is transferred from the first heat exchange space 106 to the second heat exchange space 108 through a recycle conduit 150. The portion of exhaust airflow 120 that is recycle may be regulated using the variable damper 170.

During the cooling mode of operation, the recycled exhaust airflow 120 mixes with outdoor air 128 entering the second heat exchange space 108 to reduce the temperature of the mixed airflow passing across the second heat exchanger 148 (e.g., condenser), thereby improving the COP of the HVAC system by reducing the condensation temperature. During a heating mode of operation, the recycled exhaust airflow 120 exiting the first heat exchange space 108 increases the temperature of the mixed airflow passing across the second heat exchanger 148 (e.g., evaporator), thereby improving COP of the HVAC system by increasing the evaporation temperature.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A heating, ventilation, and air conditioning (HVAC) system configured to regulate a temperature of a target conditioned space, the HVAC system comprising:

a housing comprising an interior wall that divides the housing into a first heat exchange space and a second heat exchange space, the first heat exchange space comprising:

a first outdoor air inlet configured to allow a first outdoor airflow to communicate with the first heat exchange space, a return air inlet configured to allow a return airflow from the target conditioned space to communicate with the first heat exchange space, a supply air outlet configured to allow a first conditioned airflow to discharge from the first heat exchange space to the target conditioned space, a first exhaust air outlet configured to allow a portion of the return airflow to discharge from the first heat exchange space as an exhaust airflow; and a first heat exchanger having a hollow interior space that comprises a working fluid and an outer surface configured to contact the first outdoor airflow and the return airflow, the first heat exchanger configured to transfer heat between the working fluid, the first outdoor airflow, and the return airflow to produce a first conditioned airflow; and the second heat exchange space comprising:

a second outdoor air inlet configured to allow a second outdoor airflow to communicate with the second heat exchange space;

a second heat exchanger having a hollow interior space that comprises the working fluid and an outer surface configured to contact the second outdoor airflow, the second heat exchanger configured to transfer heat between the working fluid and the second outdoor airflow to produce a second conditioned airflow; and a second exhaust air outlet configured to allow the second conditioned airflow to discharge from the second heat exchange space;

and a recycle conduit having a recycle conduit inlet configured to receive a portion of the exhaust airflow from the first exhaust air outlet, wherein the recycle conduit comprises a plurality of recycle conduit outlets configured to discharge the portion of the exhaust airflow to the second heat exchanger, and wherein the recycle conduit is configured to communicate the portion of the exhaust airflow from the recycle conduit inlet to the second heat exchanger through at least one recycle conduit outlet of the plurality of recycle conduit outlets.

2. The HVAC system of claim 1, wherein the plurality of recycle outlets comprise a perforated panel that discharges the portion of the exhaust airflow to the second heat exchanger.

3. The HVAC system of claim 1, wherein the at least one recycle outlet is positioned below a portion of the second heat exchanger.

4. The HVAC system of claim 3, further comprising at least one fluid transport device in the second heat exchange space, wherein the at least one fluid transport device is configured above the second heat exchanger and configured to pull the portion of the exhaust airflow and the second outdoor airflow across the second heat exchanger.

5. The HVAC system of claim 1, further comprising a variable damper in the first heat exchange space, wherein the variable damper is configured to regulate an amount of the return airflow that mixes with the first outdoor airflow.

6. The HVAC system of claim 1, further comprising a variable damper in the first exhaust air outlet, wherein the variable damper is configured to regulate an amount of the exhaust airflow that is recycled through the recycle conduit.

7. A method of operating a heating, ventilation, and air conditioning (HVAC) system configured to regulate a temperature of a target conditioned space, the method comprising:

receiving a first outdoor airflow and a return airflow at a first heat exchange space of a housing, wherein the housing comprises an interior wall that divides the housing into the first heat exchange space and a second heat exchange space;

transferring the first outdoor airflow and a first portion of the return airflow across a first heat exchanger in the first heat exchange space of the housing to produce a first conditioned airflow that discharges to the space;

discharging a second portion of the return airflow from the first heat exchange space as an exhaust airflow;

receiving a second outdoor airflow and a portion of the exhaust airflow in a second heat exchange space of the housing, wherein the second heat exchange space of the housing receives the portion of the exhaust air through a recycle conduit, and wherein the recycle conduit comprises a plurality of recycle outlets configured to discharge the portion of exhaust airflow to the second heat exchange space of the housing; and transferring the second outdoor airflow and the portion of the exhaust air across a second heat exchanger in the second heat exchange space of the housing to produce a second conditioned airflow that discharges from the second heat exchange space.

8. The method of claim 7, wherein the plurality of recycle outlets comprise a perforated panel that discharges the portion of the exhaust airflow to the second heat exchanger.

9. The method of claim 7, further comprising at least one fluid transport device in the second heat exchange space configured to transfer the second outdoor airflow and the portion of the exhaust air across the second heat exchanger.

10. The method of claim 9, wherein the at least one fluid transport device is positioned above the second heat exchanger and configured to pull the portion of the exhaust airflow and the second outdoor airflow across the second heat exchanger.

11. The method of claim 7, further comprising:

regulating an amount of the exhaust airflow that is recycled to the second heat exchange space using a variable damper.

12. A heating, ventilation, and air conditioning (HVAC) system configured to regulate a temperature of a space, the HVAC system comprising:

a housing comprising an interior wall that divides the housing into a first heat exchange space and a second heat exchange space;

a first fluid transport device positioned in the first heat exchange space of the housing;

a second fluid transport device positioned in a second heat exchange space of the housing;

a memory configured to store operating instructions for the first fluid transport device and the second fluid transport device; and a processor communicatively coupled to the first fluid transport device, the second fluid transport device, and the memory, wherein the processor is configured to:

transport a first outdoor airflow and a return airflow to the first heat exchange space of the housing using a first fluid transport device;

discharge a first portion of the return airflow from the first heat exchange space as exhaust airflow using the first fluid transport device;

transport the first outdoor airflow and a second portion of the return airflow across a first heat exchanger in the first heat exchange space of the housing to produce a first conditioned airflow;

discharge the conditioned airflow from the first heat exchange space to the space using the first fluid transport device;

transport a second outdoor airflow and a portion of the exhaust airflow to a second heat exchange space of the housing using the second fluid transport device, wherein the second heat exchange space of the housing receives the portion of the exhaust airflow through a recycle conduit, and wherein the recycle conduit comprises a plurality of recycle outlets configured to discharge the portion of exhaust airflow to the second heat exchange space of the housing; and transfer the second outdoor airflow and the portion of the exhaust air across a second heat exchanger in the second heat exchange space of the housing to produce a second conditioned airflow.

13. The HVAC system of claim 12, wherein the second fluid transport device is positioned above the second heat exchanger and configured to pull the portion of the exhaust airflow and the second outdoor airflow across the second heat exchanger.

14. The HVAC system of claim 12 further comprising:

a variable damper configured to regulate an amount of exhaust airflow that is recycled to the second heat exchange space of the housing;

wherein the memory is further configured to store operating instructions for the variable damper; and wherein the processor is communicatively coupled to the variable damper, and wherein the processor is configured to move the variable damper from a first position to a second position to regulate the amount of exhaust airflow that is recycled to the second heat exchange space of the housing.

15. The HVAC system of claim 14, wherein the processor is configured to move the variable damper from the first position to the second position, wherein at least 20% of the exhaust air is recycled to the second heat exchange space in the housing.

* * * * *